United States Patent [19]

Rosengren

[11] 4,266,471
[45] May 12, 1981

[54] TEA MAKER

[76] Inventor: Lars O. Rosengren, Fågelstigen 5, Huskvarna, Sweden, 56100

[21] Appl. No.: 937,772

[22] Filed: Aug. 29, 1978

[30] Foreign Application Priority Data

Sep. 5, 1977 [SE] Sweden ............................... 7709925

[51] Int. Cl.³ ............................................. A47J 31/04
[52] U.S. Cl. ..................................................... 99/305
[58] Field of Search ................ 366/305, 304, 307, 280

[56] References Cited

U.S. PATENT DOCUMENTS

| 3,520,247 | 7/1970 | Hester | 99/305 X |
| 3,948,156 | 4/1976 | Smith | 99/305 |
| 4,055,114 | 10/1977 | Kats et al. | 99/280 |
| 4,064,795 | 12/1977 | Ackerman | 99/305 |

Primary Examiner—Billy S. Taylor
Attorney, Agent, or Firm—Holman & Stern

[57] ABSTRACT

Apparatus for preparing hot beverages particularly tea comprises a water container having a water heater and a water discharge conduit. Below the container is a strainer device for holding a supply of beverage solids and below this strainer is a receiver for the finished beverage. An automatically controlled deflector is provided for directing heated water from the water conduit firstly into the strainer to mix with the solids and filter into the beverage receptacle. After a certain time the deflector automatically is moved to direct the supply of heated water straight into the receptacle. Control of the deflector is either by way of a float in the beverage receptacle or by way of a timing mechanism.

6 Claims, 2 Drawing Figures

TEA MAKER

BACKGROUND OF THE INVENTION

The present invention relates to an apparatus for preparing tea. The preparation of tea is a somewhat different and more tedious process than preparation of coffe. A specially adapted apparatus for the preparation of tea is therefore deemed justifiable.

Conventional methods in common use often comprise several of the following activities: boiling of water, placing a tea filter or strainer in a tea pot, addition of tea leaves into the filter, monitoring of steeping time, keeping the prepared beverage hot and possibly diluting with water. The parts that many people consider most annoying in these conventional methods is to monitor the boiling of water and also the steeping time. If you want to use different grades of tea or different amounts of water to automatically prepare tea with correct steeping time according to the different grades, it is desirable to have some means of time control in the procedure. An apparatus with such time control of the procedure is known where the water is heated and is allowed to pour slowly through a strainer during a preset time whereafter the water stream is switched at the end of the set time so that the water bypasses the strainer directly into a pot that is located directly below the strainer.

SUMMARY OF THE INVENTION

The present invention is a further development of the idea to deflect the flow of water after a specific infusion time has passed. The rising level of water in the collecting vessel can suitably serve as a convenient measure of the time passing from the start of infusion. The apparatus can thus be made much simpler than known apparatus of the type equipped with timers arranged to switch the flow of water. The apparatus according to the present invention has therefore been equipped with a flotation device, that measures the level and thereby infusion time, and that controls a switching device that is located in the way of the water passing from the water outlet either through the strainer or directly into the collecting vessel.

DESCRIPTION OF PREFERRED EMBODIMENTS

Figure 1:
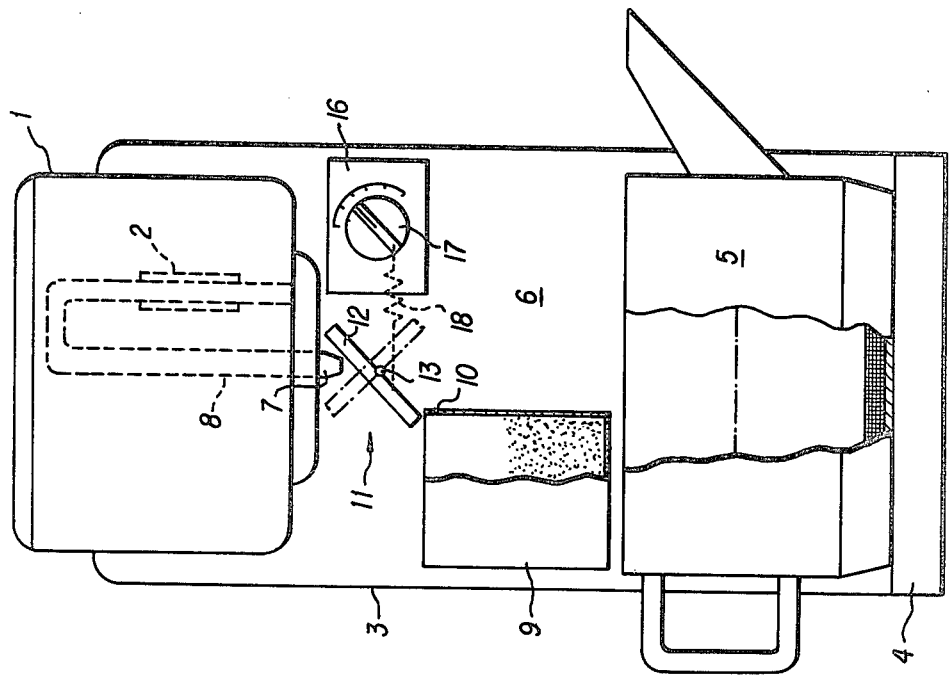
FIG. 1 is a side view of one form of tea making apparatus.

The main parts of the apparatus in both figures are the following: A water container, 1, is shown on top. Water is added to this container through a lid and is warmed to a suitable temperature by means of a heating element 2; A thermostat controls the input power to said element. A housing, 3, contains a hot plate, 4, that can hold a receiving vessel 5, where the tea and water is collected and subsequently kept at a suitable serving temperature, and a vertical member 6, that carries the container 1. The container has in its bottom an outlet 7 for boiling water, that leaves the container in a small jet. The outlet is part of the lower end of a U-shaped tube, 8, that has a one way valve and externally carries the heating element 2. An important part of the apparatus is the strainer 9, located on top of the collecting vessel. The strainer has holes in its bottom the size and number of these holes are balanced in relation to the outlet so that the level rises until it reaches a weir, 10, close to the upper rim of the strainer. In the strainer one places tea leaves in an amount according to the desired amount of tea. Between the outlet and the strainer, in the way of the water jet there is a water deflector, 11. In the present embodiment is consists of a channel, 12, that is pivoted around a horizontal pivot 13, that extends from the wall 6, thereby being rotated from the position shown in solid line to the dotted line position. In the solid line position the water is conducted into the strainer 9 and in the dotted line position it is conducted to bypass the strainer directly into the collecting vessel 5. Further associated with the deflector in the FIG. 1 arrangement there is a float 14, and a pulling member 15, connecting the flotation device with one half of the channel 12. The channel is in itself so balanced that it wants to assume the dotted line position but is normally held in the full line position by the weight of the float. As the water reaches the flotation device the balance is changed so that the channel changes position from its drawn position to the dotted position, corresponding to the dotted position of the flotation device. The pulling member 15 is adjustably connected to the channel and can be connected with different lengths that in turn correspond to the different infusion times required by different grades of tea; a low position corresponding to a short infusion time and vice versa.

The starting of the procedure to prepare tea is done manually, whereafter the apparatus operates entirely on its own. A measured amount of water is added to the container 1, tea leaves in relation to the amount af water are added in the strainer 9, that is positioned on top of the vessel 5. The pulling member 15, is connected at a position corresponding to the specific infusion time required by the grade of tea used to the channel 12. The thermostat and the switching arrangement initialize and terminate all other functions of the apparatus.

Figure 2:
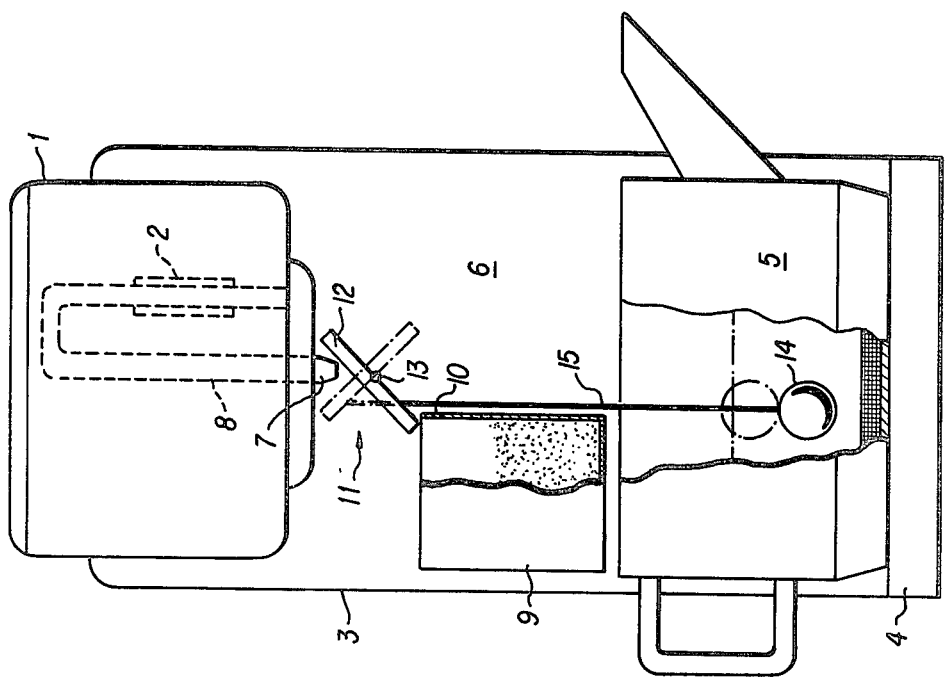
FIG. 2 is a side view of an alternative form of tea making apparatus.

The described embodiment of the apparatus serves as one example as to how the invention can be realized. Different variations of the equipment of the apparatus can be realized within the scope of the invention. It is possible to use a timer 16 as a controlling member for the channel instead of the flotation device 14 as shown in FIG. 2. The motor of the timer can be adapted to also provide the mechanical motion needed to turn the channel from the drawn position to the dotted position. In such a case the procedure is started by activating the timer by positioning the timing indicator 17 at the recommended infusion time, whereafter the channel is rotated by means of a connecting member 18, operated by the timer motor when the timer has reached its final position. By using similar control means the pivoting axes of the channel can be arranged vertically instead of horizontally as shown. All such variations are considered part of the invention beeing defined by the following claims.

What we claim is:

1. Apparatus for preparing beverages comprising a housing, a water container in said housing, said water container including water heating means and a water discharge conduit, a strainer below said water container for holding a supply of beverage solids, a compartment below said strainer for a beverage collecting vessel, a movable water diverting means for directing water from said water discharge conduit either into said strainer or into a vessel positioned in said compartment, said diverting means being movable between a first position for directing the water from said conduit into said strainer and a second position for directing the water from said conduit into said vessel and control means for moving said diverting means from said first to said second position, said control means including means responsive to the level of water in said vessel for moving said diverting means from said first to said second position.

2. The apparatus of claim 1 wherein said diverting means comprises a pivotal water deflector.

3. The apparatus of claim 1 wherein said diverting means comprises a pivotal water deflector and said level responsive means comprises a float suspended from said diverting means.

4. Apparatus for preparing beverages comprising a housing, a water container in said housing, said water container including water heating means and a water discharge conduit, a strainer below said water container for holding a supply of beverage solids, a compartment below said strainer for a beverage collecting vessel, a movable water diverting means for directing water from said water discharge conduit either into said strainer or into a vessel positioned in said compartment, said diverting means being movable between a first position for directing the water from said conduit into said strainer and a second position for directing the water from said conduit into said vessel and control means for moving said diverting means from said first to said second position, said control means including timer means for moving said diverting means from said first to said second position after a pre-set time-period.

5. The apparatus of claim 4 including means biasing said water diverting means towards said first position.

6. The apparatus of claim 4 wherein said diverting means comprises a pivotal water deflector.

* * * * *